(12) United States Patent
Graham

(10) Patent No.: US 9,478,962 B2
(45) Date of Patent: Oct. 25, 2016

(54) METHOD AND APPARATUS FOR REDUCING WIND INDUCED VIBRATION DAMAGE TO ELECTRICAL POWER LINE TOWERS

(71) Applicant: Haverfield International Incorporated, Gettysburg, PA (US)

(72) Inventor: Larry Graham, Hollsopple, PA (US)

(73) Assignee: Haverfield International Incorporated, Gettysburg, PA (US)

( * ) Notice: Subject to any disclaimer, the term of this patent is extended or adjusted under 35 U.S.C. 154(b) by 178 days.

(21) Appl. No.: 14/299,281

(22) Filed: Jun. 9, 2014

(65) Prior Publication Data
US 2015/0357808 A1    Dec. 10, 2015

(51) Int. Cl.
    H02G 7/14    (2006.01)
    H02G 7/05    (2006.01)
    H02G 7/20    (2006.01)

(52) U.S. Cl.
    CPC .......... *H02G 7/20* (2013.01); *Y10T 29/49716* (2015.01); *Y10T 29/49718* (2015.01); *Y10T 29/49741* (2015.01); *Y10T 29/53978* (2015.01)

(58) Field of Classification Search
    CPC ............ H02G 7/14; H02G 7/20; H02G 7/05; Y10T 29/49741; Y10T 29/53978; Y10T 29/49716; Y10T 29/49718
    See application file for complete search history.

(56) References Cited

U.S. PATENT DOCUMENTS

| D839,272 | | 12/1906 | Crow |
| 1,696,569 | A | 12/1928 | Hill |
| 1,703,797 | A | 2/1929 | Varney et al. |
| 2,437,375 | A | 3/1948 | Buxton |
| 3,468,571 | A * | 9/1969 | Farmer ............... E04H 12/24 174/45 R |
| 6,367,226 | B1 | 4/2002 | Shauf et al. |

* cited by examiner

*Primary Examiner* — John C Hong
(74) *Attorney, Agent, or Firm* — Stuart J. Friedman

(57) ABSTRACT

An electrical power line tower which is resistant to wind induced vibration damage supports vertically spaced apart electrical conductor-mounting cross arms extending from the tower, each cross arm having a mounting bracket welded to the tower end of the arm and the mounting bracket being attached to the tower via bolts. First clamping brackets on each conductor supporting arm are positioned between the tower and conductor, the first clamping brackets including cross arm-engaging bolts preventing bracket sliding along the arms and bracing poles extending diagonally upwardly between the first clamping brackets on each conductor supporting arm and a bolt securing the mounting bracket of the next higher arm along the tower. The length of the bracing poles is adjustable for providing the desired bracing support to the conductor support arms to which the bracing poles are attached.

13 Claims, 3 Drawing Sheets

METHOD AND APPARATUS FOR REDUCING WIND INDUCED VIBRATION DAMAGE TO ELECTRICAL POWER LINE TOWERS

FIELD OF THE INVENTION

The present invention relates to electrical power line towers having cross arms connected thereto utilizing welded connectors and, more particularly, to a method and apparatus for preventing wind induced vibration damage to the welds.

BACKGROUND OF THE INVENTION

High voltage power transmission lines carrying voltages in the hundreds of kilowatt range have been constructed to extend from spaced towers or poles (hereinafter "towers"). Towers having vertically spaced apart cross arms are frequently employed for supporting multiple high voltage electrical conductors. The conductors are typically supported under the arms of such towers using at least one suspension insulator for each conductor.

The manner in which the cross arms are connected to the towers and the types of towers and cross arms utilized vary depending upon such factors as the number and weight of the conductors to be supported, the spacing between towers, the topography of the land and the environmental conditions to which the tower and arms will be subjected. Thus, the manner of connection between the cross arms and the tower may be as simple as utilizing a cross arm bolt assembly wherein a bolt extends horizontally through the cross arm and the tower or as sophisticated as utilizing lattice type towers having lattice type arms and bridges, e.g., formed of channel or angle iron, secured to opposite faces of the tower. One type of tower and cross arm often utilized for long distance transmission and heavy, high voltage carrying conductors comprises polygonal, tubular steel towers having polygonal, tubular steel cross arms supporting the conductors at their outer ends and being affixed to the tower via welded connectors. In one frequently utilized configuration, a mounting bracket is welded to the tower end of each arm and the mounting bracket is bolted to the tower.

It has recently been observed, particularly in high wind, flat, open areas such as are encountered in states such as Texas, that the winds cause the cross arms to vibrate at dangerous vibration frequencies and the vibration of the arms, together with the heavy weight of the conductors at the ends of the arms, causes the welded connection of the arms to the mounting brackets to crack. When this occurs the entire arm and mounting bracket must be replaced. It will be appreciated that high voltage electrical transmission lines extend over long distances and utilize hundreds of towers supporting thousands of arms. When weld cracking occurs frequently on numerous cross arms, a major problem exists necessitating a repair undertaking involving considerable expense. Moreover, replacing the arm and mounting bracket where there is a cracked weld may only be a temporary solution since it does not prevent the damage from recurring to the same or a different arm.

Accordingly, there exists a need for a method for retrofitting and upgrading the hundreds of existing towers to prevent wind induced vibration-damage to the weld or welds in the welded connection between the conductor supporting cross arm and the tower, and apparatus for accomplishing this method, without the need for field welding or in any way compromising the structural integrity of the towers.

SUMMARY OF THE INVENTION

In one aspect of the present invention, there is provided a method for retrofitting an electrical power line tower, the tower comprising vertically spaced apart conductor supporting cross arms extending from at least one side of the tower, each cross arm having a mounting bracket welded to the tower end of the arm and the mounting bracket being attached to the tower via bolts for supporting the arm on the tower, each cross arm supporting a high voltage electrical conductor near its free end, the method retrofitting the tower against wind induced vibration damage to the mounting bracket welds, comprising: affixing first clamping brackets to at least one conductor supporting arm between the tower and conductor and closer to the conductor, the first clamping bracket including means to prevent its sliding along the at least one arm; mounting length-adjustable bracing poles extending diagonally upwardly between the first clamping bracket on the at least one conductor supporting arm and a bolt securing the mounting bracket of the next higher arm along the tower; and, adjusting the length of the bracing poles for providing the desired bracing support to the at least one conductor supporting arm to which the bracing pole is attached.

In another aspect of the invention, the tower further includes at least one shield wire supporting cross arm extending from the tower above the uppermost conductor supporting cross arm, each shield wire supporting cross arm having a mounting bracket welded to the tower end of the arm, the mounting bracket being attached to the tower via bolts for supporting the at least one shield wire supporting arm on the tower, the at least one shield wire cross arm supporting a shield wire near its free end, the method further including the steps of affixing first clamping brackets to each shield wire supporting arm between the tower and shield wire and closer to the shield wire; affixing a second clamping bracket to the bracing pole extending between the uppermost conductor supporting arm and a bolt securing the shield wire-supporting arm mounting bracket to the tower; and mounting a rigid support strut extending downwardly between the first clamping bracket on the shield wire supporting arm and the second clamping bracket for providing bracing support to the shield wire supporting arm.

In still another aspect of the invention, the second clamping bracket is fixedly slidable along the bracing pole on which it is mounted and including the further steps of sliding the second clamping bracket along the pole until the rigid support strut exerts the desired upward bracing support to the shield wire supporting arm and then locking the second clamping bracket in place.

In yet another aspect of the invention, the rigid support strut is length adjustable and including the further step of adjusting the length of the support strut until it exerts the desired upward bracing support to the shield wire supporting arm.

In another aspect of the invention, the clamping brackets are selected to closely conform to the cross-section of the arm to which they are affixed, each clamping bracket comprising two similarly configured halves, each half having an interior surface conformed to one half of the cross-sectional shape of the arm to which it is to be mounted, the bracket halves being configured and dimensioned such that, when placed on the arm in facing relationship, their interior surfaces conform to the cross-sectional shape of the arm.

In still another aspect of the present invention there is provided an electrical power line tower comprising vertically spaced apart conductor supporting cross arms extending from at least one side of the tower, each cross arm having a mounting bracket welded to the tower end of the arm and the mounting bracket being attached to the tower via bolts for supporting the arm on the tower, each cross arm supporting a high voltage electrical conductor near its free end, the tower being resistant to wind induced vibration damage to the mounting bracket welds, and further comprising: a first clamping bracket on at least one conductor supporting arm positioned between the tower and conductor and closer to the conductor, the first clamping bracket including means to prevent its sliding along the at least one arm; a length-adjustable bracing pole extending diagonally upwardly between the first clamping bracket on the at least one conductor supporting arm and a bolt securing the mounting bracket of the next higher arm along the tower; and, means for adjusting the length of the bracing pole mounted intermediate its ends, whereby the length of the bracing pole may be adjusted for providing the desired bracing support to the at least one conductor supporting arm to which the bracing pole is attached.

In yet another aspect of the invention, there is provided an electrical power line tower further including at least one shield wire supporting cross arm extending from the tower above the uppermost conductor supporting cross arm, each shield wire supporting cross arm having a mounting bracket welded to the tower end of the arm and the mounting bracket being attached to the tower via bolts for supporting the at least one shield wire supporting arm on the tower, the at least one shield wire cross arm supporting a shield wire near its free end, the tower further comprising: first clamping brackets on each shield wire supporting arm positioned between the tower and shield wire and closer to the shield wire; a second clamping bracket on the bracing pole extending between the uppermost conductor supporting arm and a bolt securing the shield wire supporting arm mounting bracket to the tower; and a rigid support strut extending downwardly between the first clamping bracket on the shield wire supporting arm and the second clamping bracket for providing bracing support to the shield wire supporting arm.

In another aspect of the invention the second clamping bracket is slidably positionable along the bracing pole on which it is mounted, whereby the second clamping bracket may be slid along the pole until the rigid support strut exerts the desired upward bracing support to the shield wire supporting arm and then locked in place.

In still another aspect of the invention the rigid support strut is length adjustable, whereby the length of the support strut may be adjusted until it exerts the desired upward bracing support to the shield wire supporting arm.

In yet another aspect of the invention the clamping brackets closely conform to the cross-section of the arm to which they are affixed, each clamping bracket comprising two similarly configured halves, each half having an interior surface conformed to one half of the cross-sectional shape of the arm to which it is to be mounted, the bracket halves being configured and dimensioned such that, when placed on the arm in facing relationship, their interior surfaces conform to the cross-sectional shape of the arm.

DETAILED DESCRIPTION OF THE INVENTION

Figure 1:
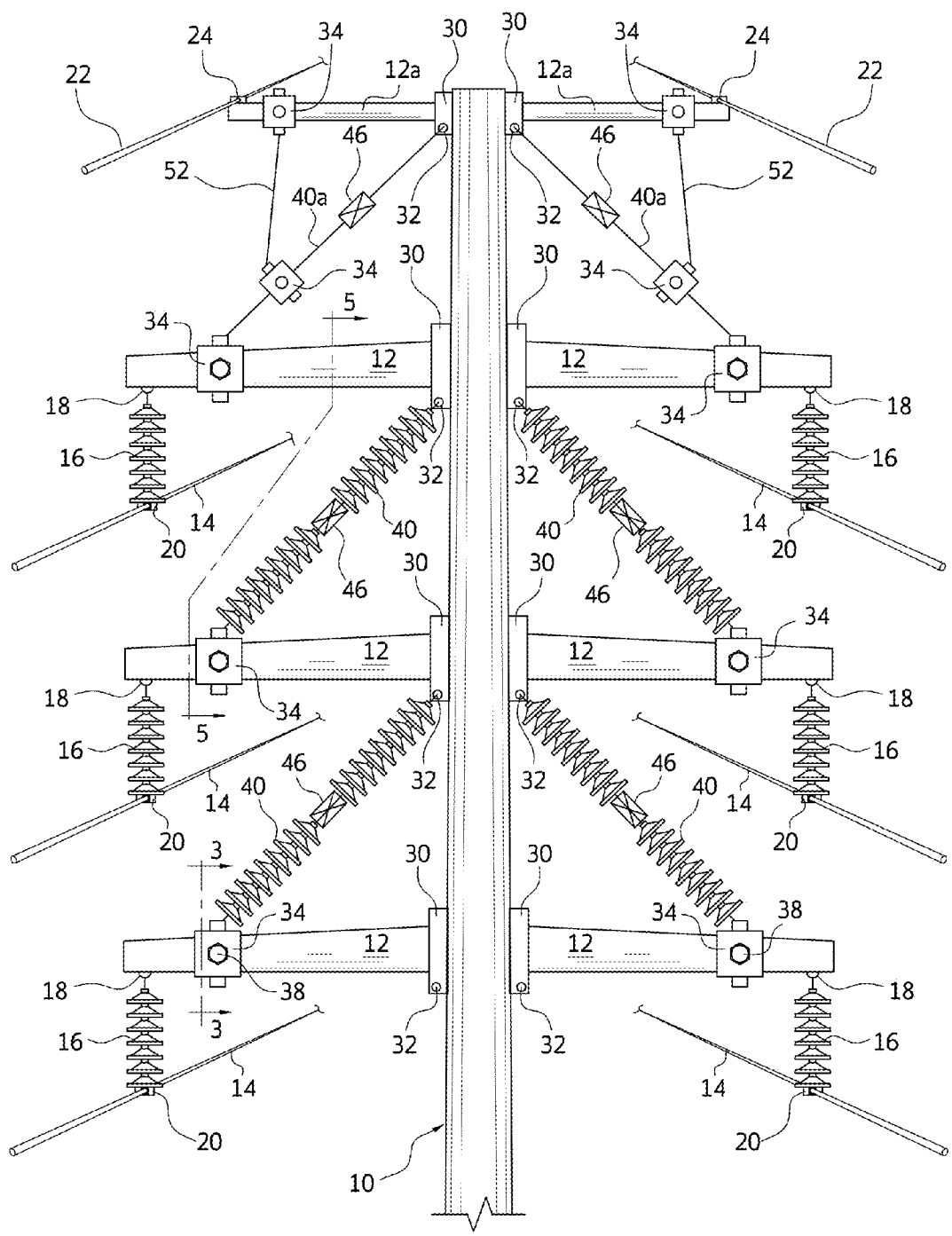
FIG. 1 is a front elevational view of a tubular steel tower having tubular steel cross arms affixed to the tower via welded connectors and supporting high voltage power transmission lines at their outer ends retrofitted in accordance with the present invention to prevent wind induced vibration damage to the welded connectors.

Referring to FIG. 1 there is shown a tower 10 which is more or less typical in the manner in which it supports high voltage conductors. The tower 10 includes several (three are shown in FIG. 1) vertically spaced apart conductor-supporting arms 12 extending outwardly from at least one side (FIG. 1 shows arms extending from two sides) of tower 10. Each conductor 14 is supported by a suspension insulator 16 depending from each of the arms 12. Typically, an insulator support plate 18 attached to the arms 12 supports the insulators 16 and the insulators are connected via pins to the insulator support plate 18. Likewise, a conductor shoe 20 supports the conductor 14 and the bottom of each suspension insulator 16 is connected via pins to the conductor shoe 20. It will be appreciated that conductor 14 is relatively heavy and its weight both places the suspension insulator 16 in tension and creates a torque in the arms 12 tending to rotate the ends of the arms downwardly. In order to avoid lightening strikes on the high voltage conductors 14, each tower 10 includes arms 12a supporting a shield wire 22 held onto the arms 12 by shield wire hardware 24.

Figure 2:
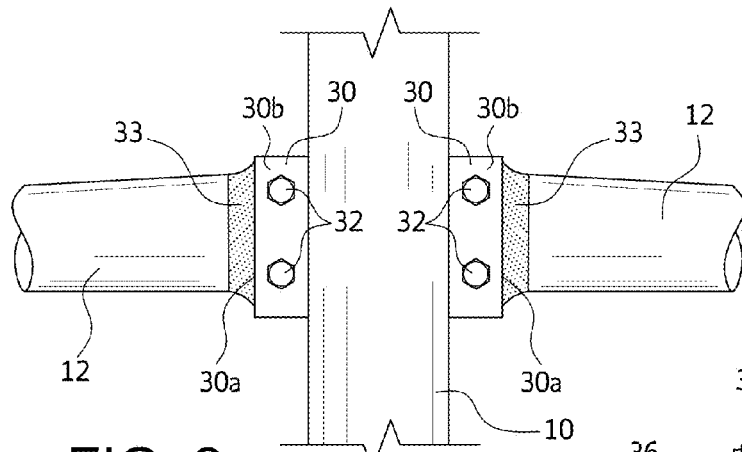
FIG. 2 is a partial front elevational view of one manner of connecting cross arms to the tower of FIG. 1 via welded connectors.

On many towers, particularly those carrying multiple very high voltage conductors, which are very heavy, the conductor-supporting arms 12 are 15 to 25 feet long and are designed to be capable of supporting the weight of the conductors. In one typical structure, the arms 12, 12a are tubular, polygonal in cross section, e.g., octagonal, and narrowingly taper from their inner ends connected to the tower to their free ends which supports the conductor 14 or the shield wire 22. Referring to FIG. 2, one means for affixing the arms 12, 12a to the tower involves use of a C-shaped mounting bracket 30 welded to the tower end of the arm 12, 12a with the weld connecting the arm 12, 12a to the web 30a of the bracket 30 and the legs 30b of the bracket 30 facing the tower 10. The legs 30b are positioned adjacent to and along the outside of tower attachment tabs (not shown) extending outwardly from the tower 10 in the direction of the arms 12, 12a and mounting bracket 30 is affixed to the tabs with multiple bolts 32. It has recently been observed, particularly in high wind areas, that the winds cause the arms 12 to vibrate at dangerous vibration frequencies and the vibrations of the arms 12 together with the heavy weight of the conductors 14 at the ends of the arms 12 causes the welded connection of the arms 12 to the web 30a of mounting bracket 30 to crack.

In accordance with the present invention, there is provided a method and apparatus for retrofitting existing towers 10 having cross arms 12, 12a which are attached via welds 33 to mounting brackets 30 which are affixed to the tower 10 via multiple bolts 32. In general terms, which are greatly expanded by the discussion which follows, one embodiment of retrofitting involves mounting an appropriately sized, slidably positionable clamping bracket 34 on each arm 12, 12a at a position along the arm between the tower 10 and the conductor 14 or shield wire 22, desirably nearer the conductor 14 or shield wire 22. The clamping bracket 34 conforms to the cross-sectional shape of the arm 12, 12a for secure attachment thereto and is locked against sliding along the arm 12, 12a. A length adjustable bracing pole 40, 40a is affixed at one end to an arm-mounted clamping bracket 34 on each conductor supporting arm 12 with the other end attached to a bolt 32 securing the mounting bracket 30 on the next higher arm 12, 12a to the tower 10. The bracing pole 40, 40a includes a length adjusting turnbuckle 46 intermediate its ends. Only the bracing poles 40 extending up to a conductor supporting arm 12 must be non-conductive to prevent arcing from the adjacent conductors 14. After each bracing pole is installed, the turnbuckle 46 is operated to adjust pole length in order to impart the desired support to each arm 12. For supporting the shield wire supporting arm 12a which has no arm above it, a support strut 52 is installed extending from the clamping bracket 34 on the shield wire supporting arm 12a downwardly to a clamping bracket 34 slidable along bracing pole 40a between the shield wire supporting arm mounting bracket 30 and the clamping bracket 34 on the next lower conductor supporting arm 12. Support strut 52 provides bracing support to the shield wire supporting arm 12a, for example, by slidable positioning of the slidable clamping bracket 34 along bracing pole 40a. It will be appreciated that the sequence and procedure for retrofitting existing towers outlined in the foregoing embodiment and elaborated in the discussion which follows may be applied to a single conductor or shield wire supporting arm or to multiple or all such arms on a tower and may be adjusted as circumstances as well as the availability of materials and personnel allow.

Figure 3:
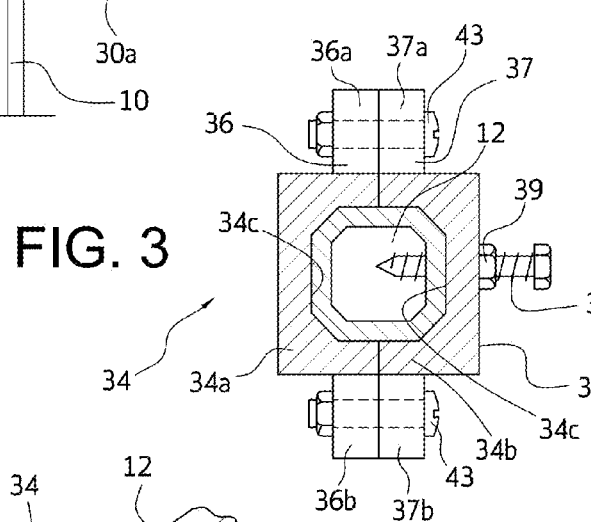
FIG. 3 is a cross sectional view taken along line 3-3 in FIG. 1 of a clamping bracket on a cross arm.
Figure 4:
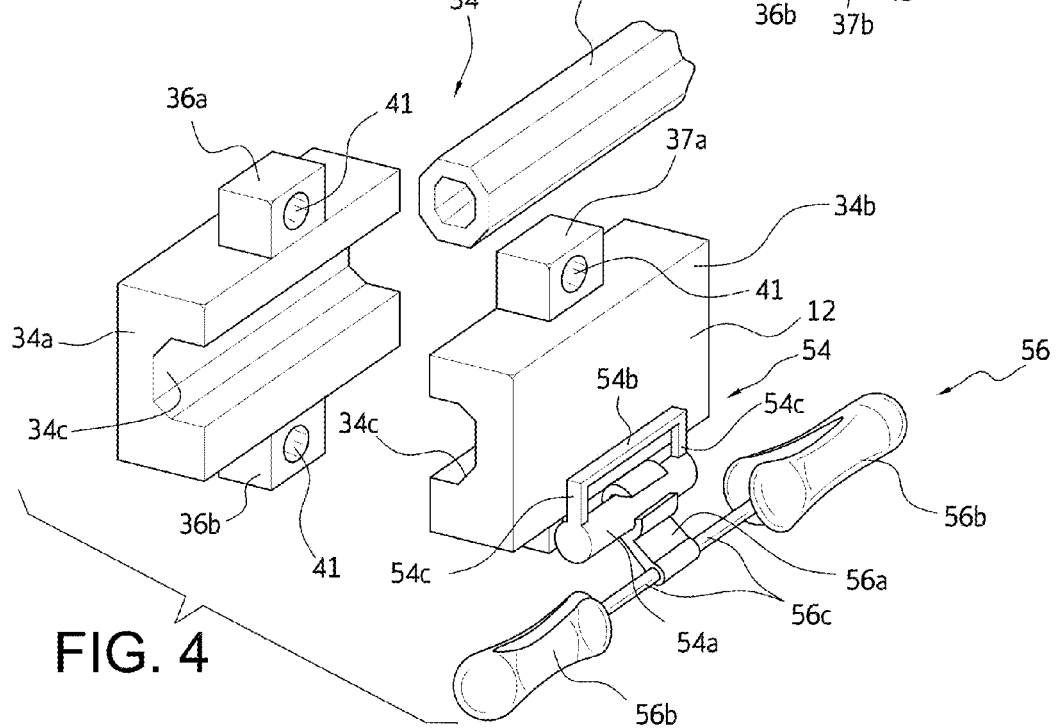
FIG. 4 is an exploded perspective view showing the manner in which a clamping bracket having an optional vibration damper affixed thereto is mounted on a cross arm.

Referring to FIGS. 1 and 3-4, there is provided a two-piece slidably positionable clamping bracket 34 for mounting on each arm 12, 12a (shown in cross-section in FIG. 3 and in exploded perspective in FIG. 4) of the tower 10, at a location between the tower 10 and the conductor 14 or shield wire 22, desirably about three quarters of the length of the arm 12, 12a from tower 10. Clamping bracket 34 is desirably formed in two similarly configured halves 34a, 34b, each half having an interior surface 34c conformed to one half of the cross-sectional shape of the arm 12, 12a to which it is to be clamped. Each half 34a, 34b of the bracket 34 includes flanges 36, 37 having bolt holes 41 formed therein, the flanges 36, 37 projecting outwardly from opposite sides of each bracket half 34a, 34b. The bracket halves 34a, 34b are configured and dimensioned such that, when placed on the arm 12, 12a in facing relationship, their interior surfaces 34c conform to the cross-sectional shape of the arm 12, 12a and the flanges 36, 37 on bracket halves 34a, 34b, respectively, are aligned with their bolt holes 41 in registry. The bracket halves 34a, 34b, once in place, are loosely secured together around arm 12, 12a via bolts 43 extending through aligned bolt holes 41, or via other well known attachment means. This allows clamping bracket 34 to slide along arm 12, 12a to a desired position. A side wall 34d of at least one of the bracket halves 34a, 34b receives a punch bolt 38, which threadingly extends through a lock nut 39 and penetrates side wall 34d and a side wall of the arm 12, 12a, extending into its hollow center for engaging the arm 12a, 12a to lock the clamping bracket 34 in the desired position along the arm 12, 12a and prevent further sliding therealong. The lock nut 39 is threaded along the punch bolt 38 until it engages the outer surface of bracket side wall 34d to tighten punch bolt 38 in place. Once clamping bracket 34 is fixed in position by punch bolt 38, bolts 43 are tightened to secure the clamping bracket halves 34a, 34b together around arms 12, 12a.

Figure 5:
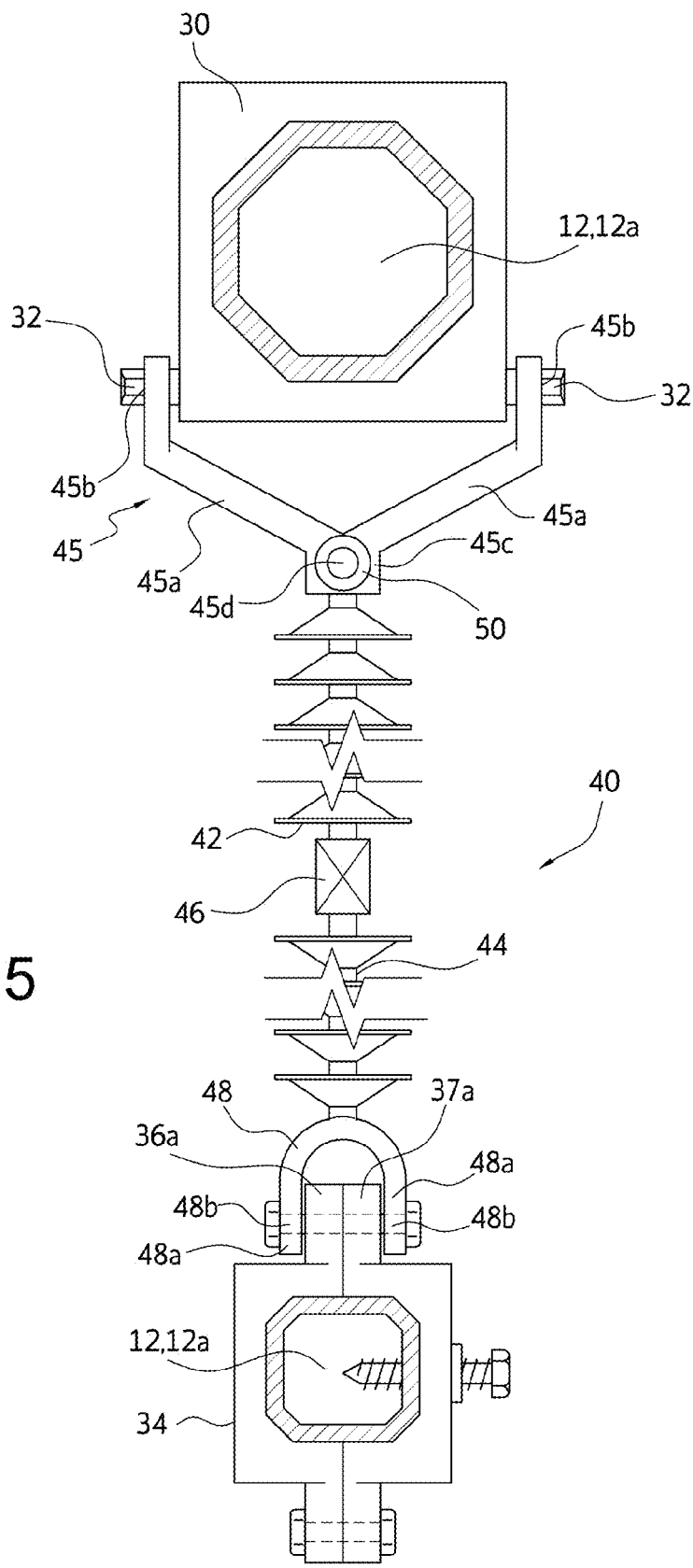
FIG. 5 is a cross sectional view taken along line 5-5 in FIG. 1 showing a cross arm bracing pole and a preferred manner of its attachment to the clamping bracket of one cross arm and the mounting bracket of the next higher cross arm along the tower.

Referring to FIGS. 3-5, clamping bracket 34 is desirably emplaced on each arm 12 with flange portions 36a, 37a extending upwardly and flange portions 36b, 37b extending downwardly. A length adjustable, bracing pole 40 is affixed at one end either directly to flanges 36a, 37a or indirectly via a fitting 48 to flanges 36a, 37a via aperture 41 in flanges 36a, 37a of clamping bracket 34 on each arm 12 except the clamping bracket 34 on the shield wire supporting arm 12a. Bracing pole 40 extends diagonally upwardly therefrom into either direct engagement or indirect engagement via a fitting 45 with one of the bolts 32 securing the C-shaped mounting bracket 30 of the next higher arm 12 along tower 10. As can be seen in FIG. 5, in a preferred embodiment, the length adjustable bracing pole 40 desirably comprises two polymer insulator segments or strings 42, 44 extending from opposite ends of a turnbuckle 46 (or equivalent length adjusting feature) with the free end fitting 48 of one insulator segment attaching directly or indirectly to the upwardly extending flanges 36a, 37a and the free end fitting 50 of the other insulator segment attaching directly or indirectly to a bolt 32 attaching the mounting bracket 30 of the next higher arm 12, 12a. The polymer insulator segments are, desirably, formed of molded silicone rubber polymer alloys, for example, with ethylene propylene (EP) copolymers; however, any known mechanically strong and electrically insulating polymer insulator can be used. The turnbuckle 46 adjusts the overall length of the insulator bracing pole 40 and thereby aids in bracing the arm 12, 12a against vibration. Only bracing poles 40 which extend diagonally upwardly to conductor supporting arms 12 are, desirably, comprised of non-conductive insulators to prevent arcing from the adjacent conductors 14. The bracing pole 40a extending from the clamping bracket 34 on the highest conductor supporting arm 12 to the mounting bracket 30 on the shield wire supporting arm 12a need not comprise insulators because there is no conductor hanging from the shield wire supporting arms 12 and, therefore, no risk of arcing. Rather, bracing pole 40a is desirably formed of metal and includes a clamping bracket 34 slidably positionable thereon and fixable in a desired position therealong. It will be appreciated that due to the reduced cross-sectional dimensions of the shield wire supporting arm 12a and bracing pole 40a, the clamping brackets 34 mounted thereon are generally smaller in size than the clamping brackets 34 mounted on conductor supporting arms 12.

Inasmuch as the arm 12a mounting the shield wire hardware 24 has no arm 12 above it, a metal strut 52 extends downwardly from aperture 41 of flanges 36b, 37b of the clamping bracket 34 on the shield wire supporting arm 12 to aperture 41 in upwardly extending flanges 36a, 37a of slidable clamping bracket 34 on bracing pole 40a. Metal strut 52 may, in one embodiment, provide upward bracing support to the shield wire supporting arm 12 by moving slidable clamping bracket 34 along bracing pole 40a until strut 52 exerts the desired upward force on shield wire supporting arm 12 and then locking the slidable clamping bracket 35 in the desired position, e.g., using a punch bolt 38, as previously discussed. Alternatively, a turnbuckle or equivalent length adjusting means (not shown) can be positioned between the end segments of metal strut 52 for adjusting the length of strut 52 until it adequately supports shield wire supporting arm 12a.

Referring to FIG. 4, as an optional, but desirable, feature, each clamping bracket 34 on a conductor supporting arm 12 may have a damper support bracket 54 depending from a lower surface thereof or from downwardly extending flanges 36b, 37b. Damper support bracket 54 includes a cylindrical, horizontally oriented rod 54a for mounting a vibration damper 56 to aid in preventing fatigue damage to the arm 12 and its welded connection to the mounting bracket 30 caused by wind-induced vibration. In one embodiment, damper support bracket 54 may be an inverted U-shaped bracket having its web 54b rigidly affixed to clamping bracket 34 or flanges 36b, 37b and its depending legs 54c supporting the cylindrical, horizontally oriented rod 54a. Commercially available damping systems may be used, such as the Fargo 4-R Vibration Damper, available from Hubbell Power Systems, Inc. of Columbia, S.C., which employs, as shown in FIG. 4, an aluminum vise clamp 56a for securely latching onto cylindrical rod 54a and for supporting unequal weights 56b on messenger cables 56c of unequal length.

Referring to FIG. 5, there is illustrated one preferred manner of connecting bracing pole 40, 40a to the flanges 36a, 37a of a clamping bracket 34 on a conductor supporting arm 12 and to a bolt affixing the mounting bracket 30 of the next higher arm 12, 12a to tower 10. A preferred fitting 45 for connecting the free ends of bracing pole 40 to a bolt which secures mounting bracket 30 to tower 10 comprises a clevis-like fitting, e.g., having a U-shaped yoke, V-shaped yoke or wishbone shaped yoke, in which the distance between the yoke legs 45a at their free end is sufficient to encompass the width of mounting bracket 30. In one example, fitting 45 is generally V-shaped including two legs 45a, each including an aperture 45b near its free end and a tab or stub leg 45c at the vertex where the legs 45a intersect, having an aperture 45d therein. Aperture 45d aligns with a corresponding aperture in an ear 50 affixed to one end of bracing poles 40, 40a and a bolt extending through aperture 45d and the apertures in the ears 50 on bracing poles 40, 40a secures the bracing poles 40, 40a to fitting 45. Typically, fitting 45 is secured at its other end to the lower bolt holding mounting brackets 30 and arms 12, 12a onto tower 10. The apertured free ends of legs 45a are positioned along the outside surface of the mounting brackets 30 at the location of one of the bolt holes and a bolt of suitable length is inserted through apertures 45b, mounting brackets 30 and tower attachment tabs (not shown) to securely retain fitting 45 in position on tower 10.

Still referring to FIG. 5, in one embodiment, a U-shaped clevis-type fitting 48 is affixed at the opposite end of bracing pole 40, 40a. The distance between the clevis legs 48a at their free end is sufficient to encompass both flanges 36a, 37a of clamping member 34. Each of clevis legs 48a include an aperture 48b near its free end. The apertured free ends of clevis legs 48a are positioned along the outside surfaces of flanges 36a, 37a with apertures 48b in the clevis legs 48a aligned with corresponding apertures 41 in flanges 36a, 37a such that a bolt extending through apertures 48b and the aligned apertures 41 in flanges 36a, 37a secures the bracing pole 40, 40a to flanges 36a, 37a. It will be appreciated that the connection of apertured ears or tabs on a first part and clevis-like fittings on a mating part can be reversed and the clevis-like fitting can be secured to the first part for interconnection to apertured ears or tabs on the mating parts. The connection of bracing pole 40, 40a to the flanges 36, 37 of a clamping bracket 34 on a conductor supporting arm 12 and to a bolt securing the mounting brackets 30 of the next higher arm 12, 12a along tower 10 contemplates, in other embodiments, the interchangeability of these various fittings.

In practice, one preferred manner of retrofitting a tower 10 involves emplacing a ladder on the tower 10 and transferring linemen to the tower 10 via helicopter. Typically it is preferred to commence retrofitting with the highest conductor supporting arm 12 (or arms 12 if conductor supporting arms extend at equal heights from opposite sides of tower 10). This is because they carry the heavy load imposed by the conductors and, since the integrity of the welds on the conductor supporting arms 12 is uncertain, it is safest to retrofit the highest conductor supporting arms first. Commencing with one of the highest conductor support arms, a clamping bracket 34 is mounted loosely on arm 12 near the conductor supporting end of arm 12 but spaced therefrom. The bottom bolt 32 is removed which secures the mounting bracket 30 on the next higher arm, which typically will be the shield wire supporting arm 12a, and fitting 45 is installed on the mounting bracket 30 by aligning its mounting apertures 45b in registry with the bolt holes for the removed bottom bolt 32 and then reinserting bottom bolt 32 to secure fitting 45 to the mounting bracket 30. One end of bracing pole 40a (with turnbuckle 46 intermediate its ends) is affixed to aperture 45d of stub leg 45c of fitting 45 using a bolt (not shown) and the other end is affixed via fitting 48 and bolt 43 to apertures 41 in flanges 36a, 37a. Clamping bracket 34 is slid outwardly toward its conductor supporting end to take up any slack in bracing pole 40a and then clamping bracket 34 is locked in place using punch bolt 38 and lock nut 39. At this point, bolt 43 is tightened to secure the clamping bracket halves 34a, 34b together and turnbuckle 46 is operated to adjust the length of bracing pole 40a to impart the desired support to the conductor support arm 12. This procedure is repeated with each conductor supporting arm 12, in turn, on both sides of tower 10, by working, in each instance, on the highest conductor supporting arm 12 until all conductor supporting arms are retrofitted. For retrofitting lower conductor supporting arms, instead of bracing pole 40a, bracing pole 40 comprising two polymer insulator segments 42, 44 extending from opposite ends of turnbuckle 46 is used to prevent arcing from adjacent conductors. After all conductor supporting arms have been retrofitted, the shield wire supporting arms 12a are retrofitted by loosely mounting a clamping bracket 34 on each shield wire supporting arm 12a near the shield wire end of arm 12a but spaced therefrom. Next, a clamping bracket 34 is loosely mounted on bracing pole 40a between the end thereof attached to the clamping bracket 34 on the next lower conductor supporting arm 12 and turnbuckle 46. A metal strut 52 is attached at one end, directly or indirectly, to downwardly extending flanges 36b, 37b of clamping bracket 34 on shield wire support arm 12a and is attached at its other end, directly or indirectly, to upwardly extending flanges 36a, 37a of clamping bracket 34 on bracing pole 40a. Clamping bracket 34 on shield wire supporting arm 12a is locked in position using punch bolt 38 and lock nut 39 and bolt 43 is tightened to secure clamping bracket halves 34a, 34b together. Thereafter, clamping bracket 34 on bracing pole 40a is slid toward turnbuckle 46 to take up any slack in strut 52 and until strut 52 provides adequate support to shield wire supporting arm 12a. Clamping bracket 34 on bracing pole 40a is then locked in position using punch bolt 38 and lock nut 39 and bolt 43 is tightened to secure the clamping bracket halves 34a, 34b together.

While the present invention has been described in terms of specific embodiments thereof, it will be understood that no limitations are intended to the details of construction or design other than as defined in the appended claims.

The invention claimed is:

1. A method for retrofitting an electrical power line tower comprising vertically spaced apart, elongate conductor supporting cross arms extending from at least one side of the tower, each said cross arm having a mounting bracket welded to the tower end of said arm, said mounting bracket being attached to the tower via bolts for supporting said arm on said tower, each said cross arm supporting a high voltage electrical conductor near its free end, said method retrofitting said tower against wind induced vibration damage to said mounting bracket welds, comprising:
   a) affixing a first clamping bracket to at least one conductor supporting arm between the tower and conductor and closer to the conductor, said first clamping bracket including means to prevent its sliding along said at least one arm;
   b) mounting a length-adjustable bracing pole extending diagonally upwardly between said first clamping bracket on said at least one conductor supporting arm and a bolt securing the mounting bracket of the next higher arm along said tower; and
   c) adjusting the length of said bracing pole for providing bracing support to the at least one conductor support arm to which said bracing pole is attached.

2. A method, as claimed in claim 1, wherein said tower includes at least one shield wire supporting cross arm extending from said tower above the uppermost conductor supporting cross arm, each said shield wire supporting cross arm having a mounting bracket welded to the tower end of said arm, said mounting bracket being attached to the tower via bolts for supporting said at least one shield wire supporting arm on said tower, said at least one shield wire cross arm supporting a shield wire near its free end, further including the steps of:
   d) affixing first clamping brackets to each shield wire supporting arm between the tower and shield wire and closer to the shield wire;
   e) affixing a second clamping bracket to said bracing pole extending between said uppermost conductor supporting arm and a bolt securing the shield wire-supporting arm mounting bracket to said tower; and
   f) mounting a rigid support strut extending downwardly between said first clamping bracket on said shield wire supporting arm and said second clamping bracket for providing bracing support to said shield wire supporting arm.

3. A method, as claimed in claim 2, wherein said second clamping bracket is slidably positionable along the bracing pole on which it is mounted and including the further steps of sliding said second clamping bracket along said pole until said rigid support strut exerts an upward bracing support to said shield wire supporting arm and then locking said second clamping bracket in place.

4. A method, as claimed in claim 2, wherein said rigid support strut is length adjustable and including the further step of adjusting the length of said support strut until it exerts an upward bracing support to said shield wire supporting arm.

5. A method, as claimed in claim 1, including the step of mounting vibration dampers to at least some of the conductor supporting arms on said tower.

6. A method, as claimed in claim 5, including the step of mounting vibration dampers on said clamping brackets affixed to at least some of the conductor supporting arms on said tower.

7. A method, as claimed in claim 1, wherein the step of mounting a bracing pole to a bolt securing the mounting bracket of the next higher arm along said tower comprises connecting a free end of said bracing pole nearest said bolt to one end of a clevis-like fitting, the other end of said fitting comprising a yoke having spaced apart yoke legs in which the distance between the yoke legs is sufficient to encompass the width of said mounting bracket, positioning said yoke legs along an outside surface of the mounting bracket at the location of said bolt and inserting a bolt through said yoke legs and said mounting bracket to securely retain said fitting on said tower.

8. A method, as claimed in claim 1, wherein said first clamping brackets are selected to closely conform to a cross-section of the arm to which they are affixed, each said first clamping bracket comprising two similarly configured halves, each half having an interior surface conformed to one half of the cross-sectional shape of the arm to which it is to be mounted, the bracket halves being configured and dimensioned such that, when placed on said arm in facing relationship, their interior surfaces conform to the cross-sectional shape of the arm.

9. A method, as claimed in claim 8, wherein said first clamping bracket halves are secured together around said arm via bolts extending through aligned bolt holes in flanges projecting from the bracket halves.

10. A method, as claimed in claim 1, wherein said length-adjustable bracing poles which extend diagonally upwardly to a bolt securing the mounting bracket on a conductor supporting arm are formed of non-conductive material to prevent arcing from adjacent conductors.

11. A method, as claimed in claim 10, wherein said length-adjustable bracing poles comprise length-adjustable non-conductive insulator strings.

12. A method, as claimed in claim 1, wherein said first clamping brackets are slidably positionable along said arm on which they are mounted and are fixable in a desired position.

13. A method for retrofitting an electrical power line tower comprising vertically spaced apart, elongate conductor supporting cross arms extending from at least one side of the tower and at least one shield wire supporting cross arm extending from said tower above the uppermost conductor supporting cross arm, each said cross arm having a mounting bracket welded to the tower end of said arm, said mounting bracket being attached to the tower via bolts for supporting said arm on said tower, each said cross arm supporting a high voltage electrical conductor or a shield wire near its free end, said method retrofitting said tower against wind induced vibration damage to said mounting bracket welds, comprising:
   a) affixing first clamping brackets to each conductor and shield wire supporting arm between the tower and conductor or shield wire and closer to the conductor or shield wire, said first clamping brackets including means to prevent their sliding along said arms and being selected to closely conform to a cross-section of the arm to which they are affixed, each said first clamping bracket comprising two similarly configured halves, each half having an interior surface conformed to one half of a cross-sectional shape of the arm to which it is to be mounted, the bracket halves being configured and dimensioned such that, when placed on said arm in facing relationship, their interior surfaces conform to the cross-sectional shape of the arm;
   b) mounting length adjustable bracing poles extending diagonally upwardly between said first clamping brackets on each conductor supporting arm and a bolt securing the mounting bracket of the next higher arm along said tower, said bracing poles which extend upwardly to a bolt securing the mounting bracket on a conductor supporting arm being formed of non-conductive material to prevent arcing from adjacent conductors;

c) affixing a second clamping bracket to said bracing pole extending between said uppermost conductor support arm and a bolt securing the shield wire supporting arm mounting bracket to said tower;

d) mounting a rigid support strut extending diagonally downwardly between said first clamping bracket on said shield wire supporting arm and said second clamping bracket for providing bracing support to said shield wire supporting arm;

e) adjusting the length of said bracing poles for providing the desired bracing support to the conductor supporting arms to which said bracing poles are attached; and f) mounting vibration dampers to at least some of the conductor supporting arms on said tower.

\* \* \* \* \*